United States Patent [19]

Baltes et al.

[11] Patent Number: 4,537,504

[45] Date of Patent: Aug. 27, 1985

[54] SECURITY BLANK WITH ENHANCED AUTHENTICATING FEATURES, AND A METHOD AND AN APPARATUS FOR DETERMINING THE GENUINENESS OF THE SECURITY BLANK

[75] Inventors: Heinrich P. Baltes; Andrew S. Glass, both of Zug; Karl Jauch, Le Lignon, all of Switzerland

[73] Assignee: LGZ Landis & Gyr Zug AG, Zug, Switzerland

[21] Appl. No.: 342,065

[22] Filed: Jan. 25, 1982

[30] Foreign Application Priority Data

Feb. 3, 1981 [CH] Switzerland ............................ 720/81
Apr. 16, 1981 [CH] Switzerland .......................... 2559/81
Sep. 23, 1981 [CH] Switzerland .......................... 6126/81

[51] Int. Cl.³ .............................................. G06K 7/10
[52] U.S. Cl. ........................................ 356/71; 283/85; 356/354
[58] Field of Search ................. 356/71, 354, 355, 356; 283/70, 85, 86, 91

[56] References Cited

U.S. PATENT DOCUMENTS 4,119,361 10/1978 Greenaway ...................... 350/3.6 X
4,129,382 12/1978 Greenaway ........................... 356/71
4,250,393 2/1981 Greenaway .......................... 250/566

FOREIGN PATENT DOCUMENTS 2205428 11/1973 Fed. Rep. of Germany .
2538875 9/1978 Fed. Rep. of Germany .
2814890 8/1979 Fed. Rep. of Germany .

OTHER PUBLICATIONS

"Inverse Problems and Coherence" Ferwerda et al., International U.R.S.I.—Symposium 1980 on Electromagnetic Waves, Munich, Aug. 26–29, 1980, pp. 315C/1 and 315C/2.
"Meaurement of Second-Order Coherence in a Light Beam Using a Microscope & a Grating" Carter, Applied Optics, vol. 16, #3, Mar. 1977, pp. 558–563.

*Primary Examiner*—Vincent P. McGraw
*Attorney, Agent, or Firm*—Ernest F. Marmorek

[57] ABSTRACT

A security blank is formed with a light-redirecting spatial structure including a deterministic component establishing at least one authenticating feature, and a stochastic component superimposed on the deterministic component, and sufficiently obscuring the deterministic component so as largely to frustrate recognition of the function of the authenticating feature by intensity measurement of light reflected therefrom. Recognition of the function of the authenticating feature is made possible by a method and an apparatus measuring the degree of coherence of two narrow bundles of light rays obtained from light reflected from the spatial structure upon its illumination by light of a selected wavelength.

47 Claims, 42 Drawing Figures

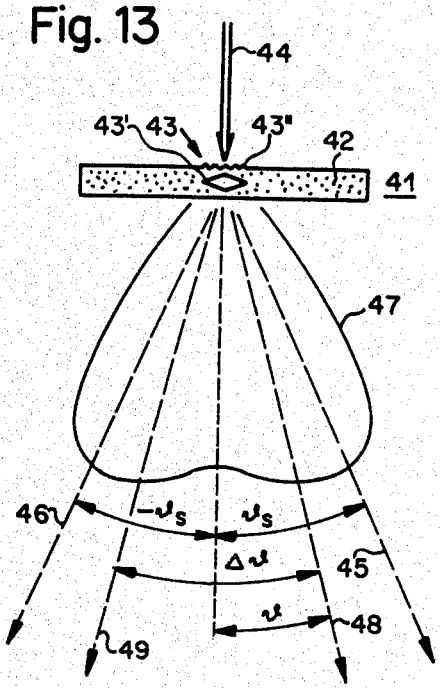
Fig. 13
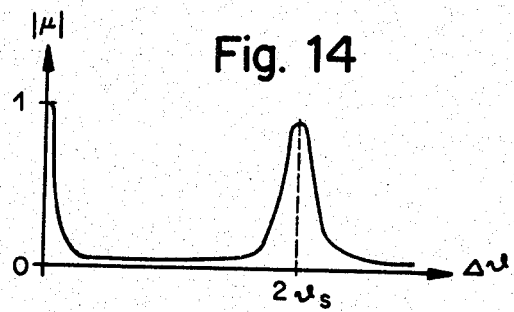
Fig. 14
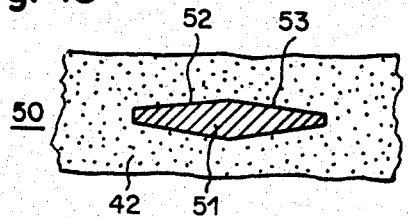
Fig. 15
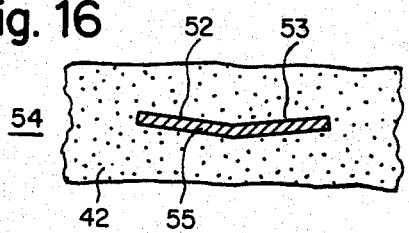
Fig. 16
Fig. 17
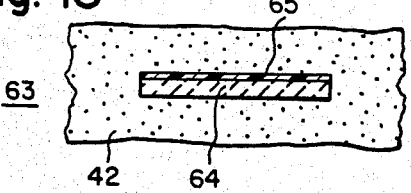
Fig. 18
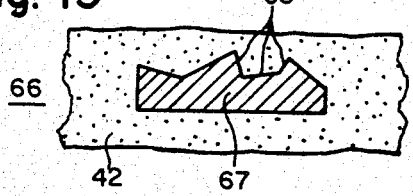
Fig. 19

SECURITY BLANK WITH ENHANCED AUTHENTICATING FEATURES, AND A METHOD AND AN APPARATUS FOR DETERMINING THE GENUINENESS OF THE SECURITY BLANK

BACKGROUND OF THE INVENTION

Most of the documents currently in use, such as bank notes, credit cards, identity cards, railroad tickets, airline tickets, checks and the like, can be forged by modern reproduction methods with no great difficulty. Many proposals have been made with the aim to provide such documents with authenticating features, which increase the expense of successfully forging the document, and therefore increase its security, that is, lower the probability that it may be successfully forged. A relatively high degree of security from forging is attained, if authenticating features in the form of spatial structures are embedded in the document, which bend or diffract incident light in a characteristic manner. Such spatial structure, for example, holographically manufactured structures, phase diffraction gratings and kinoforms, can only be manufactured at a high technical cost. As a result of measurable aspects of spatial intensity distribution of light scattered from such documents, automatically operating test devices may determine the genuineness of such documents.

There is known a method of determining the genuineness of a document or security blank from German Patent DE2538875, which includes a light-redirecting spatial structure establishing at least one authenticating feature. The method includes the steps of illuminating the spatial structure, forming from light scattered from the spatial structure two narrow bundles of light rays, converting the two bundles of light rays into electric signals, determining a characteristic measurement value for the spatial structure, and forming "yes" or "no" outputs in dependence of the characteristic measurement value. The document includes a phase diffraction grating, which diffracts or bends the energy obtained from a light source in a predetermined ratio along individual specified directions. When examining the document and determining whether or not it is genuine, it is considered genuine when the diffractions of light energy distributed along certain directions have a predetermined ratio to one another.

From German Patent DE2814890 it is also known to determine the genuineness of a document which has a phase diffraction grating embedded therein, by comparing the intensity of light diffracted along a certain direction with the intensity of diffusely scattered light.

It is also known to embed a security thread in bank notes which has the form of a flat metal strip or plastic strip and a rectangular cross-section. Such security threads which are easily visible, and can also be easily felt, permit a simple and rapid examination relating to the genuineness of the document. Embedding of the security thread in a paper layer or plastic layer requires, however, a costly process, which is difficult for a forger to reproduce. To further decrease the risk of forging, and thus enhance the security of the document, and to automatically establish the presence and genuineness of the security thread by a machine, it is known from German Pat. No. DE2205428 to provide the security thread with microscopically small openings, which may, for example, represent a code pattern, which can then be read out with the aid of light beams or particle beams.

SUMMARY OF THE INVENTION

It is one of the principal objects of the present invention, to devise a security blank with enhanced authenticating features, and a method and an apparatus for determining the genuineness of the security blank, which can detect forgeries of genuine documents at a high degree of reliability, and which further permits to hide an authenticating feature in the document, which can only be established with great difficulty by conventional methods of testing the genuineness of documents, but can easily be established by the method of the present invention.

The present invention is based on the recognition that the object of the invention can be attained by the further development and practical application of scientific theoretical investigations dealing with the subject of inverse optical problems remote from the field of the present invention. From the International U.R.S.I. Symposium on electromagnetic waves held in Munich, Federal Republic of Germany from Aug. 26 to Aug. 29, 1980, and as stated on pages 315C/1 to 315C/2, that in a partially coherent source having a periodic phase profile obtained by the superposition of a phase diffraction grating and a randomly diffusing element, the presence of the periodic phase profile can be established more easily by measuring the degree of coherence of scattered light rays than the intensity thereof.

This object is attained in a method of determining the genuineness of a security blank having a light-redirecting spatial structure establishing at least one authenticating feature, which includes illuminating the spatial structure, forming from light scattered from the spatial structure two narrow bundles of light rays, and converting the two bundles of light rays into electrical signals, by the improvement which comprises the steps of determining the degree of coherence between the two bundles of light rays, forming "yes" or "no" outputs in dependence of the degree of coherence determined, and ascertaining from the outputs information pertaining to the genuineness of the security blank.

BRIEF DESCRIPTION OF THE DRAWING

For a fuller understanding of the nature and objects of the invention, reference should he had to the following detailed description, taken in connection with the accompanying drawings in which.

Figure 6A:
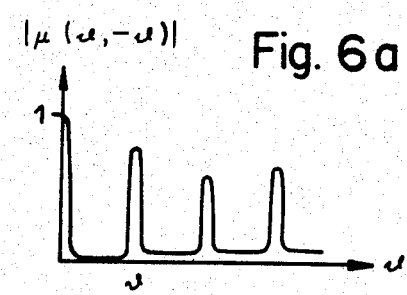
FIG. 6a is a plot of intensity versus the deflection angle of a phase diffraction grating having a diffraction constant g, according to the method of the present invention.
Figure 6B:
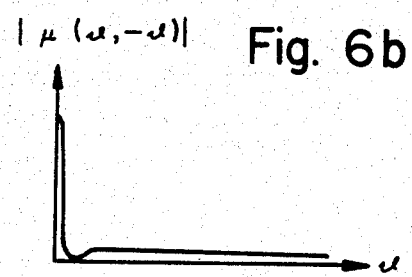
FIG. 6b is a plot of intensity versus the deflection angle of a purely diffuse scatterer having a correlation length l, according to the method of the present invention.
Figure 6C:
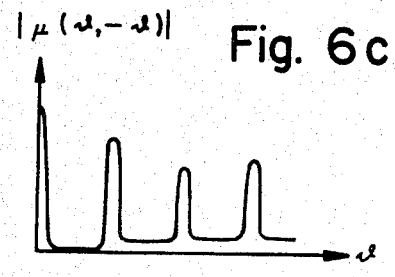
Figure 6D:
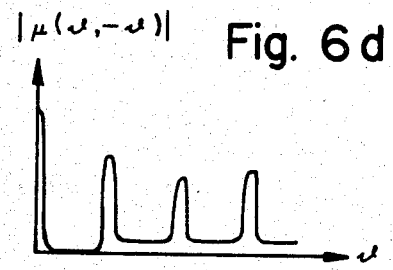
Figure 6E:
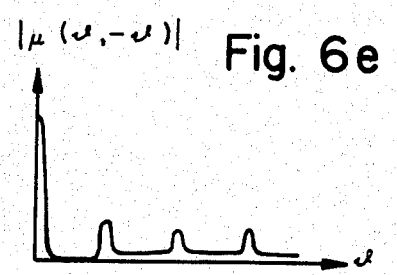
Figure 7:
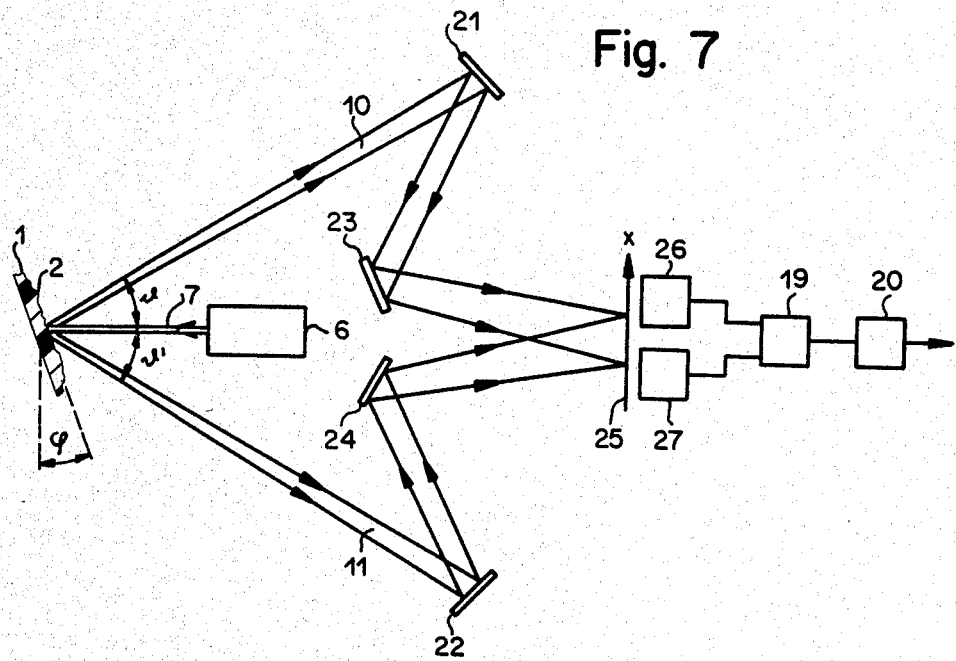
Figure 8:
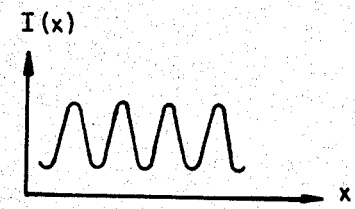
Figure 9:
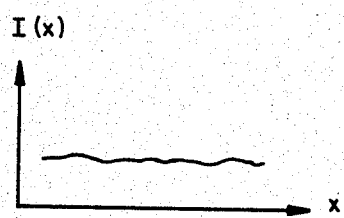
Figure 10:
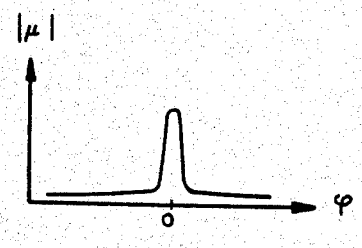
Figure 11:
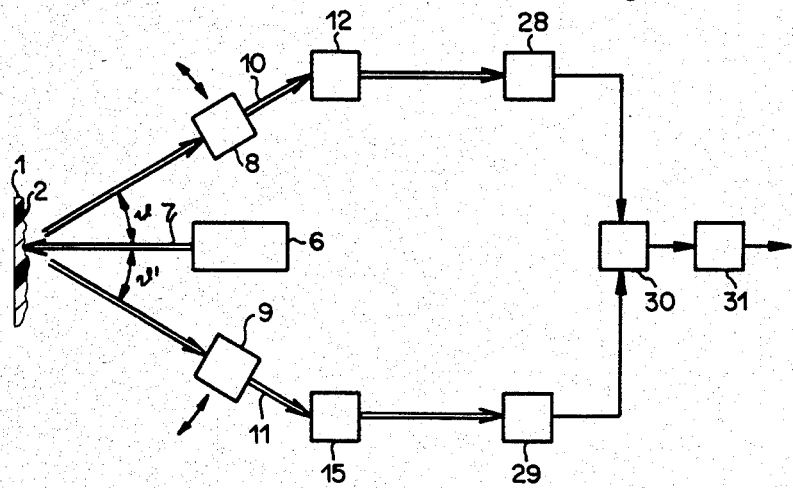
Figure 12:
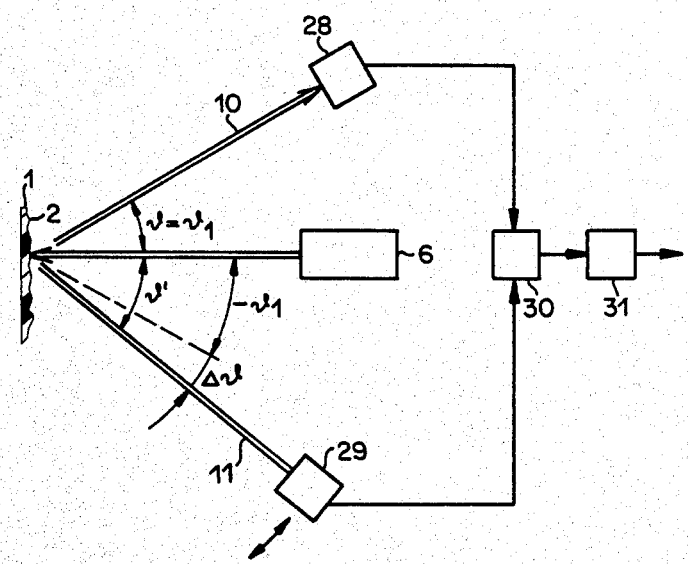
Figure 20:
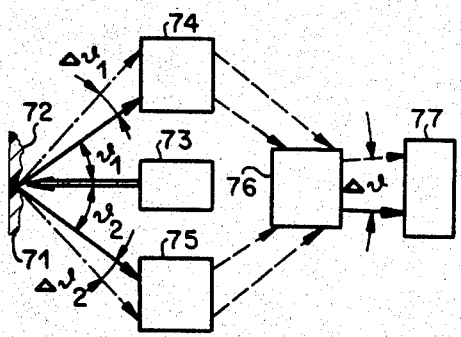
Figure 21:
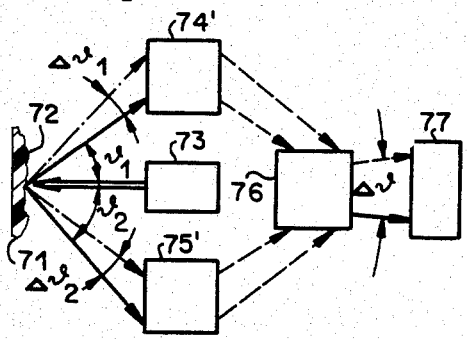
Figure 22:
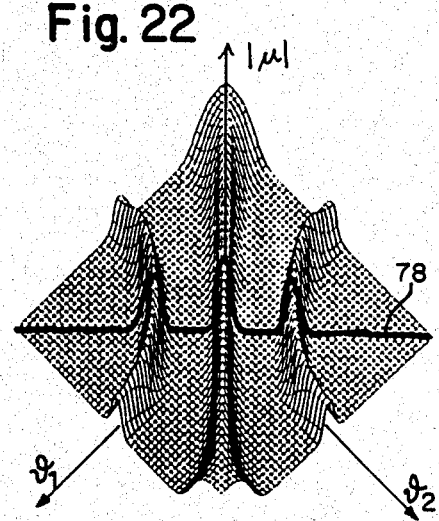
Figure 23:
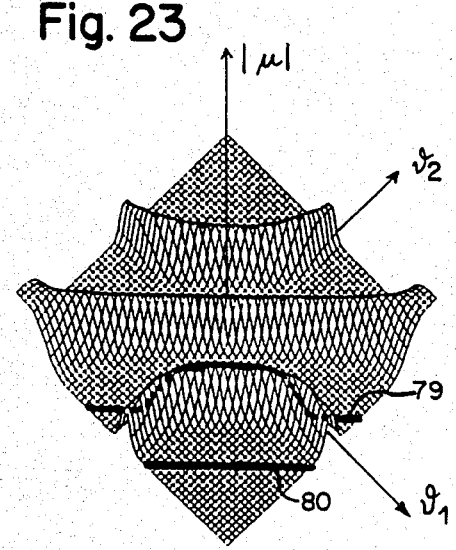
Figure 24:
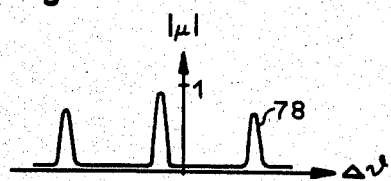
Figure 25:
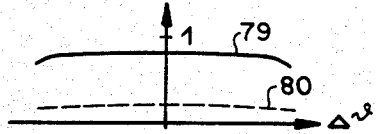
Figure 26:
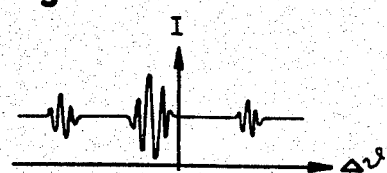
Figure 27:
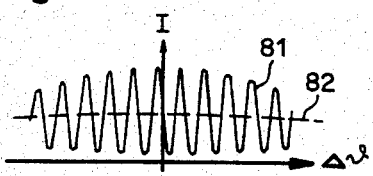
Figure 28:
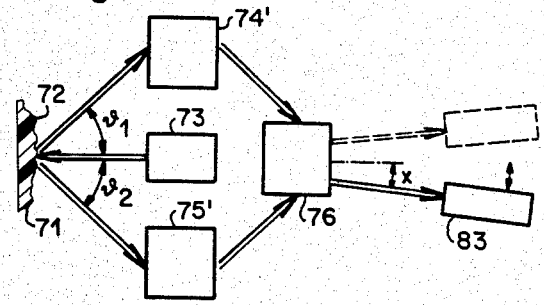
Figure 29:
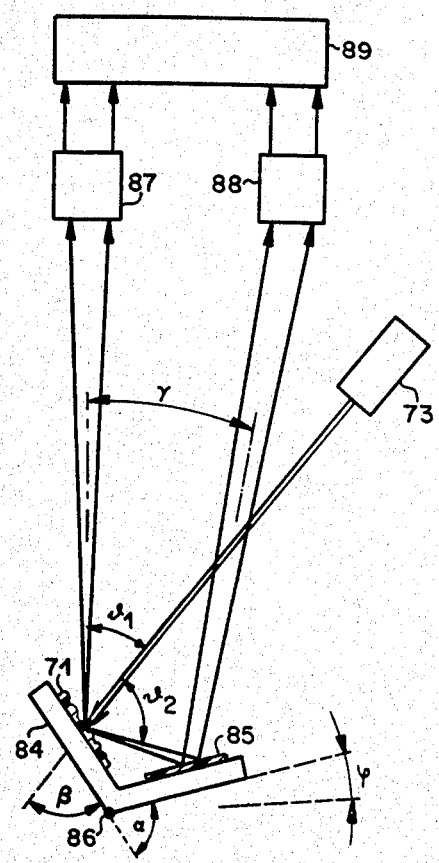
Figure 30:
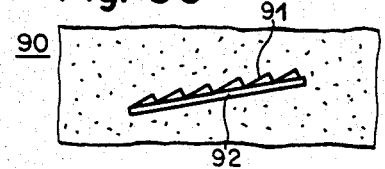
Figure 31:
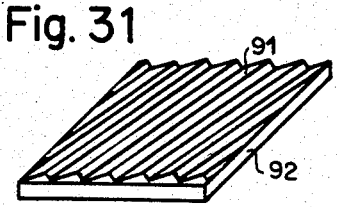
Figure 32:
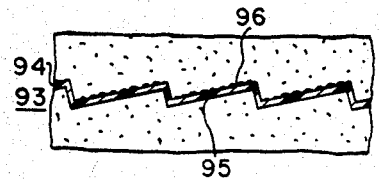
Figure 33:
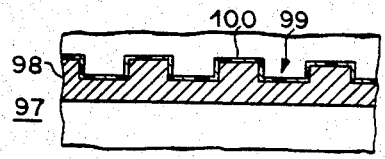
Figure 34:
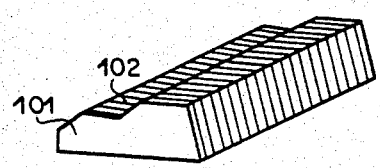

6c is a plot of intensity versus the deflection angle of phase diffraction grating and a diffuse scatterer where l is approximately equal to g;

FIG. 6c is a plot of intensity versus the deflection angle of phase diffraction grating and a diffuse scatterer where l is approximately equal to g/10, according to the method of the present invention;

FIG. 6e is a plot of intensity versus the deflection angle when a diffuse scatterer is superimposed on a phase diffraction grating, where l is approximately equal to g/20;

FIG. 7 is a second version of an apparatus for determining the genuineness of a security document;

FIG. 8 is a diagram of the intensity of the interference fringes of two coherent light waves as the function of the phase difference or path length between two light beams;

FIG. 9 is a diagram of the intensity versus phase difference similar to FIG. 8, but at an angular position of the security document having light incident thereon at an angle other than 90°;

FIG. 10 is a diagram of the contrast, which is a relation of the maxima and minima of the intensities shown in FIG. 8, versus the phase difference or path length of two coherent light sources when the security document has light incident thereon at an angle of 90°;

FIG. 11 is a third version of an apparatus for determining the genuineness of a security blank;

FIG. 12 is a fourth version of an apparatus for determining the genuineness of a security blank;

FIG. 13 is a schematic diagram illustrating a method of illuminating a document or security blank which includes a deterministic component and a stochastic component, so that its genuineness cannot easily be determined by intensity measurement, but can be determined by measurement of coherence of light rays passing through the authenticating features;

FIG. 14 is a diagram of the absolute value of the contrast as a function of deflection angle;

FIG. 15 is a cross-section of a security blank including a carrier and an authenticating feature in the form of a strip embedded therein;

FIG. 16 is a cross-section of the security blank similar to FIG. 15, but showing another cross-sectional shape of the authenticating feature;

FIG. 17 is a cross-section of a security blank illustrating a ray dividing device;

FIG. 18 is a cross-section of a security blank similar to FIG. 15, but showing an authenticating feature including a reflection layer;

FIG. 19 is a cross-section of a security blank similar to FIG. 15, but where the authenticating feature has an irregular cross-section;

FIG. 20 is a fifth version of an apparatus for determining the genuineness of a security blank;

FIG. 21 is a sixth version of an apparatus for determining the genuineness of a security blank;

FIG. 22 is an image of contrast obtained from the apparatus shown in FIG. 20 with an odd number of image reversals;

FIG. 23 corresponds to FIG. 22 but with an even number of image reversals;

FIG. 24 is a diagram of contrast versus deflection angle according to the apparatus of FIG. 20;

FIG. 25 is a diagram of contrast versus deflection angle according to the apparatus of FIG. 21;

FIG. 26 is a diagram of intensity versus deflection angle of interference fringes according to the apparatus of FIG. 20;

FIG. 27 is a diagram of intensity versus deflection angle of interference fringes according to the apparatus of FIG. 21;

FIG. 28 is a seventh version of an apparatus for determining the genuineness of security documents;

FIG. 29 is an eighth version of an apparatus for determining the genuineness of a security blank;

FIG. 30 is a cross-section of a security blank in which an authenticating feature is embedded at an angle to the main surface of the security blank;

FIG. 31 is a perspective view of the authenticating feature of FIG. 30;

FIG. 32 is a cross-section of a security blank containing an authenticating feature with a microscopically superimposed diffusing feature;

FIG. 33 is a cross-section of a security blank including an authenticating feature embedded therein, and a partially light-transparent reflective layer superimposed thereon; and FIG. 34 is a perspective view of a security thread used for embedding in a security blank, which has a cross-section other than circular or rectangular, and a microscopic embossment structure on its surface.

DESCRIPTION OF THE PREFERRED EMBODIMENTS

Figure 1:
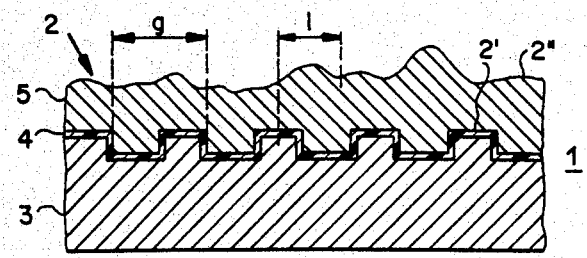
FIG. 1 is a cross-section of a security blank including an authenticating feature.

Referring now to the drawings, the document or security blank illustrated in FIG. 1 may be a credit card, an identity card, a railroad ticket, bank note, airline ticket, check or the like. It includes one of several authenticating features in the form of a spatial structure 2 including a deterministic component 2', which deflects light incident thereto by diffraction or bending of the transmitted or reflected light in at least one predetermined direction, and may be implemented by a phase hologram, a phase diffraction grating, kinoform, or the like, and the genuineness of which may be examined in an automated test apparatus based on light scattered from the structure 2. In the example illustrated the deterministic component 2' consists of a phase diffraction grating, which has been embedded in a substantially flat thermoplastic substrate 3, and is covered with a thin reflection layer 4. A protective layer 5, which in the example illustrated has a coarse and diffusely scattering surface, protects the phase diffraction grating and the reflection layer 4 from mechanical damage. The coarse surface of the protecting layer 5 forms a stochastic and diffusely scattering component 2'', of the structure 2 which is superimposed on the deterministic component 2'. It is advantageous if the substrate 3 is non-transparent to light, and if the protecting layer 5 is transparent only for infrared light, so that at least the deterministic component 2' of the structure 2 is hidden from the human eye.

Typical measurement distances of the deterministic component 2', in the case of a diffraction grating the grating constant, have been denoted in FIG. 1 with g, and the correlation length of the stochasting component 2" has been denoted as l. The correlation length l is, simply expressed, the average particle size of the surface roughness of the stochastic component 2". Expressed more accurately, l represents the length, which taken along a stochastic height dimension h(s) is a function of the length dimension s, and still shows a certain correlation, namely h(s) can still be statistically correlated with h(s±l). Here h is the height dimension and s the longitudinal dimension of the stochastic component 2".

The protective layer 5 may, for example, also consist of a material having a spatially fluctuating index of refraction and have a smooth surface. In this case the correlation l of the stochastic component, roughly speaking, will be understood as the average "particle size" of the fluctuation of the refractive index.

Figure 2:
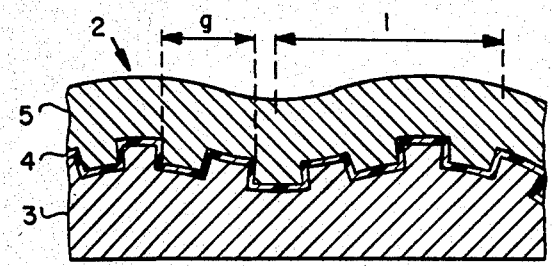
FIG. 2 is another cross-section of the security blank including another version of an authenticating feature.

The document 1' of FIG. 2 differs from the document 1, in that the phase diffraction grating is disposed on an undulatory surface, namely a surface other than the flat surface of the substrate 3, forming the stochastic component of the structure 2.

Figure 3:
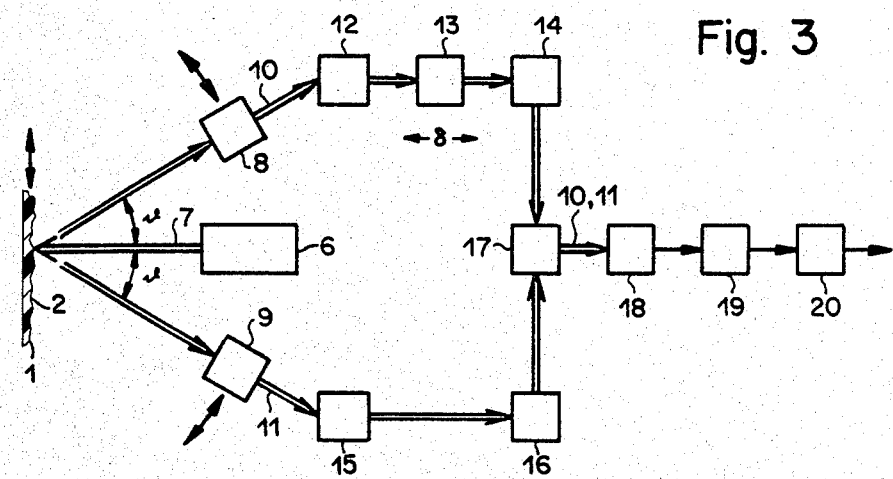
FIG. 3 is a block diagram of a first apparatus for determining the genuineness of a security blank.

In FIG. 3 a light source 6 irradiates a document 1 or 1' by means of a light ray 7. The light ray 7 should at least be quasi-monochromatic, namely emit light at a selected wavelength, and have a certain spatial coherence, namely the correlation length immediately ahead of structure 2 should be at least equal to typical measurement distances g of the deterministic component 2'. The cross-section of the ray should, however, be large in comparison to the typical measurement distances g.

In what follows the term "light" will be used, even though it will be understood to include also invisible light, such as light in the ultraviolet and infrared spectrum.

The light reflected from the structure 2 is made to impinge on two light-sorting members 8 and 9, each passing a narrow light bundle 10 or 11 at a preferably adjustable average scattering angle $\theta$ or $\theta'$. Movable apertures, mirrors or prisms may be employed as the light-sorting members 8 and 9. They preferably operate synchronously, so that $\theta' = -\theta$.

The bundle of rays 10 passes through a deflecting member 12, a path difference member 13, as well as another deflecting member 14 to a superimposing or superposition member 17, and correspondingly the bundle of rays 11 passes through deflection members 15 and 16 to the same superimposing or superposition member 17, which reunites the bundles of light rays 10 and 11. The path difference member 13 generates a variable optical path difference between the bundle of light rays 10 and 11. Mirrors, prisms, optical fibers, electro-optical deflectors and the like may serve as deflecting members 12, 14, 15 and 16; a prism, movable mirror, a medium with a variable index of refraction and the like may serve as a path difference member 13, for example, and a semi-transparent mirror, a fiber-optical link and the like may serve as a superimposing or superposition member 17.

The reunited bundle of rays 10 and 11 impinge on photoelectric means 18, which may be implemented, for example, by a silicon diode, a photomultiplier, or the like. The photoelectric means 18 is connected to an electronic signal processor 19, to which there is post-coupled an electronic decision circuit 20.

A (non-illustrated) control apparatus controls the sequence of examining the document or security blank for genuineness, by providing the required mechanical or electronic adjustment signals, enabling signals or stop signals, and passing them to the members 6, 8, 9, 13, 18, 19 and 20. But it may also operate a (non illustrated) drive, which, as a result of parallel displacement of the document 1, permits the establishment of an average value of the measurement, which will be described in what follows.

Figure 4:
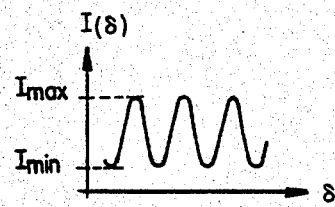
FIG. 4 is a diagram of the intensity of interference fringes as a function of the path- or phase-difference of two coherent light rays.

To illustrate the method of operation, it will be initially assumed that the spatial structure 2 of a document is a symmetrical diffraction grating, and that the light-sorting members 8 and 9 are so adjusted that $\theta = \theta_1$, and that $\theta' = \theta_{-1} = -\theta_1$, where $\theta_1$ is the angle of the first order of diffraction, and $\theta_{-1}$ is the negative value of the angle of the first order of diffraction of the diffraction grating. The control drive switches the light source 6 on, and on the light-sensitive surface of the photoelectric means 18 there appear interference fringes, in view of the interference between the bundle of rays 10 and 11. The control drive controls the path difference member 13 so that the path difference $\delta$ is continuously changed. As can be seen from FIG. 4, therefore the intensity $I = I(\delta)$ of the interference fringes varies between a maximum value $I_{max}$, and a minimum value $I_{min}$. The photoelectric sensor means 18 detects the intensity $I = I(\delta)$, and the signal processing means 19 measures $I_{max}$ and $I_{min}$, and calculates the so-called contrast $|\mu|$ of the interference fringes according to the relation $$|\mu| = (I_{max} - I_{min})/(I_{max} + I_{min})$$

The measured value of the contrast $|\mu|$ is a value depending on the degree of coherence of the bundles of light rays 10 and 11, and is passed to the decision means 20 as a measurement value to form a "yes" signal, or a "no" signal. The decision means 20 determines that the document or security blank 1 is genuine and therefore generates a "yes" signal, if the measurement value of the contrast $|\mu|$ exceeds, for example a predetermined threshold value.

The contrast is in general a function of the scattering angle $\theta, \theta'$ namely $|\mu| = |\mu(\theta, \theta')|$ It is therefore advantageous to continuously vary the angle $\theta$ and $\theta'$ to measure the contrast $|\mu|$ as a function of the angles $\theta$ and $\theta'$, and to compare the measured values determined in the decision means 20 with a pre-stored threshold function. In this manner, for example a document or security blank including a diffraction grating is determined only as genuine if the degree of coherence in several orders of diffraction is within respective predetermined limits.

Figure 5A:
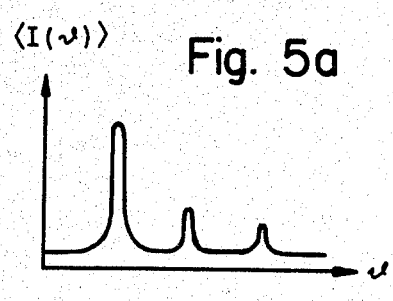
FIG. 5a is a diagram of the intensity versus the deflection of a phase diffraction grating having a grating constant g, where the intensity is determined by conventional methods.
Figure 5B:
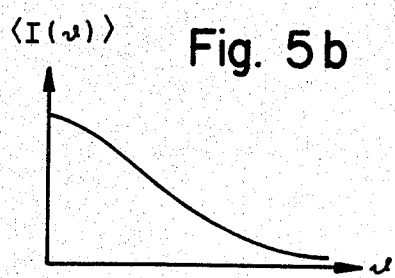
FIG. 5b is a diagram of the intensity versus the deflection angle of a diffuse scatterer having a correlation length l, where the intensity is measured by conventional methods.
Figure 5C:
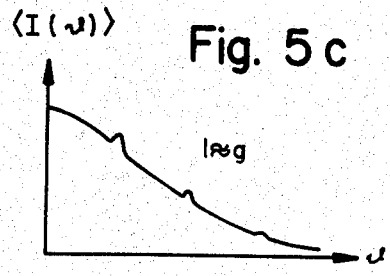
FIG. 5c is a superposition of a diffraction grating and a diffuse scatterer, where l is approximately equal to g, showing light intensity versus the deflection angle.
Figure 5D:
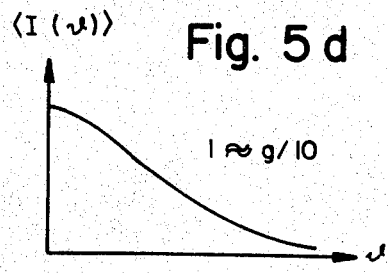
FIG. 5d is a superposition of a diffraction grating and a diffuse scatterer, where l is approximately g/10, showing light intensity versus the deflection angle.
Figure 5E:
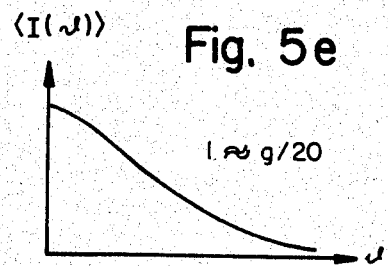
FIG. 5e is a superposition of a diffraction grating and a diffuse scatterer, where l is approximately g/20, showing light intensity versus the deflection angle.

FIGS. 5a through 5e show intensity measurements made on various spatial structures according to the known intensity measurement methods obtaining angular intensities $<I(\theta)>$ of the scattered radiation, wherein the brackets $< \ldots >$ denote the average value. The contrast $|\mu(\theta_1 - \theta)|$ obtained according to the degree of coherence measurement according to the present invention, is shown in FIGS. 6a through 6e. The various figures apply for the following structures:

FIGS. 5a and 6a apply to a pure phase diffraction grating having a grating constant g;

FIGS. 5b and 6b only apply to a purely diffuse scatterer having a correlation length l;

FIGS. 5c and 6c apply to the superposition of a phase diffraction grating and of a diffuse scatterer having a correlation length $l \approx g$;

FIGS. 5d and 6d apply to the superposition of a phase diffraction grating with a diffuse scatterer having a correlation length $l \approx g/10$; and FIGS. 5e and 6e apply to the superposition of a phase diffraction grating with a diffuse scatterer having a correlation length $l \approx g/20$.

It will be easily seen that the degree of coherence measurement described permits a reliable determination pertaining to the genuineness of the document, even when the authenticating feature is strongly perturbed by a stochasting component, and even if the examination pertaining to the genuineness of the document is rendered more difficult by intensity distribution, or even made impossible thereby. The measurement of the degree of coherence therefore permits recognition of the authenticating features in the form of phase diffraction gratings, holograms and the like which, for example are disposed on a coarse surface, or whose pattern is worn and therefore rendered more diffuse.

The probability against successful forging can be further increased if, for example according to FIGS. 1 and 2, a stochastic and diffusely scattering component 2'' is superimposed on the deterministic component 2' of the structure 2, which renders recognition of the function of an authenticating feature by intensity measurement more difficult, or makes it impossible, but which still permits recognition thereof by measurement of the degree of coherence. This is made possible if the correlation length l of the stochastic component 2'' is at most one-fifth of the typical measurement g of the deterministic component 2'.

FIG. 7 is a special and particularly simple apparatus for an interferometric measurement of the degree of coherence; parts identical to those shown in FIG. 3 have been given the same reference numerals. The bundle of light rays 10 and 11 are sorted out by means of mirrors 21 and 22, and deflected to a common detector plane 25 by means of two further mirrors 23 and 24. The angles $\theta$ and $\theta'$ are firmly adjusted to $\theta = \theta_1$ and $\theta' = -\theta_1$. The document or security blank 1 is disposed on a (non-illustrated) and pivotable holder, which permits varying of the angle $\phi$ between the surface of the document 1 and a plane at right angles to the axis of the ray of light. In the detector plane 25 there are disposed two photoelectric detectors 26 and 27 in such a manner that one photoelectric detectors senses a light zone, and the other photoelectric detector a dark zone of the interference fringes appearing on the detector plane 25; a signal processing element 29 is postcoupled to the photoelectric detectors 26 and 27.

The angle $\phi$ is varied. A value of the angle $\phi = 0$ corresponds to a perpendicular incidence of the light beam 7 on the document 1, and leads, as can be seen from FIGS. 8 and 10, to a maximum contrast $|\mu|$ of the interference fringes, if the spatial structure 2 contains a diffraction grating.

When $\phi \neq 0$, however, no contrast appears, as can be seen from FIG. 9. The decision means 20 postcoupled to the signal processor 19 provides a "yes" signal, if the contrast $|\mu|$ exceeds a predetermined threshold value. The reliability of determining the genuineness of the document can be further increased if the "yes" signal is only generated when, upon pivoting the document 1, the change of contrast exceeds a predetermined value.

In lieu of the contrast $|\mu|$ of the interference fringes it is also possible to measure the so-called intensity correlation of second order $g^{(2)}$. This will be further explained with the aid of FIGS. 11 and 12. The apparatus of FIG. 12 corresponds to the apparatus according to FIG. 3 as far as elements 6, 8, 9, 12 and 15 are concerned. The light bundles 10 or 11 re-routed by the deflection members 12 or 15, respectively, impinge on photoelectric detection means 28 and 29, respectively. The photoelectric detection means 28 and 29 are connected to the signal processing means 30, a decision means 31 being postcoupled to the signal processing means 30.

When determining the genuineness of the document or security blank 1 the angles $\theta$ and $\theta'$ are continuously varied. The signal processing means 30 operates as an electronic correlator and obtains the intensity correlation $g^{(2)}(\theta, \theta')$ according to the equation $$g^{(2)}(\theta, \theta') = \frac{<I(\theta) \cdot I(\theta')>}{<I(\theta)> \cdot <I(\theta')>}$$

When the bundles of light rays 10 and 11 have a sufficiently large cross-section, the two values $|\mu|$ and $g^{(2)}$ are related by the known relation $g^{(2)} = 1 + |\mu|^2$. At the output of the decision means 31 there appears a "yes" signal, if the intensity correlation $g^{(2)}$ exceeds a predetermined threshold.

In FIG. 12 there is shown a special and particularly simple apparatus for measuring the intensity correlation. The photoelectric detectors 28 and 29 serve both as sorting means for the bundle of light rays 10 and 11, and as detection means. The angle $\theta$ is set to the value $\theta = \theta_1$ of the first order of diffraction. The photodetector 29 is arranged to be pivotable, so that the angle $\theta' = -\theta_1 \pm \Delta\theta$ may be varied by the amount $\Delta\theta$. The intensity correlation $g^{(2)}$ is maximal when $\Delta\theta = 0$.

In the devices according to FIGS. 11 and 12, in lieu of two photoelectric detection means 28 and 29 a single photodetector can be used. Here, for example, the function $I(\theta)$ and the measurement values are stored digitally or in an analog manner; then the function $I(\theta')$ is determined therefrom and $g^{(2)}$ is calculated. By means of a photodetector acting as a photomultiplier, and of an electronic counter used as a memory, it is possible to implement this version at a low technical cost. Such correlation measurement methods are known, for example from the book "Photocorrelation and Light Beating Spectroscopy" 1974 Plenum Press, New York, and will therefore not be discussed here in further detail.

With the aid of FIGS. 13 to 19 there will be illustrated a method which is more compatible with conventional methods of manufacturing a document than the embedding of macroscopically fine light-bending structures, but which still provides a low probability of successful forgery, and where the authenticating feature is hidden from the human eye.

The security blank 41 in FIG. 13 may be a document, a bank note, a credit card, an identity card, a railroad ticket, an airline ticket, a check or the like. A carrier 42 of the security blank 41 consists, for example of synthetic material, paper or cardboard. An authenticating feature in the form of a spatial structure 43 is embedded in the carrier 42, which is formed of a macroscopic (deterministic) optical element 43', and of a scattering element 43". The macroscopic optical element 43' is formed so that it deflects a light beam 44 incident on the document 41 according to the laws of geometrical optics to at least two predetermined directions 45 and 46, by bending or reflection, (in the illustrated example by bending), and wherein the light beam 44 has a certain spatial coherence. The scattering element, namely the stochastic element 43", is in effect superimposed onto the macroscopic optical element 43', and causes a diffuse scattering of the light beam 44 in such a manner, that recognition of the function of the macroscopic optical element 43' by means of the intensity pattern 47 of the scattered light is at least rendered much more difficult, if not impossible, while the scattered light is still mutually coherent along the predetermined directions 45 and 46. The scattering element 43" may be formed by the material and/or the surface structure of the carrier 42, or of the optical element 43'.

The scattering angle of an arbitrary ray 48 of the total light scattered from the structure 43 is designated in FIG. 13 as $\theta$; the angle between the ray 48 and a ray 49 symmetrical thereto about an axis perpendicular to the surface of the carrier 1, when a ray of light 44 is incident at right angles to the surface of the document 41 is denoted as $\Delta\theta$, and the scattering angle of the rays 45 and 46 scattered in respective predetermined directions is denoted as $\theta_s$ or $-\theta_s$.

In a method of examining the genuiness of the document 41, the light ray 44 is generated by means of an automatically operating test apparatus from a light source, and the structure 43 is illuminated thereby. From the light scattered from the structure 43 two narrow light beams 45 and 46 are extracted along the predetermined directions 45 and 46. By means of a photodetector and an electronic signal processor there is obtained a measurement value from the two light beams 45 and 46 in dependence of their mutual degree of coherence. From this measurement value there is obtained a "yes" signal or a "no" signal. The document 41 is regarded as genuine when the degree of coherence, namely the contrast $|\mu|$ or the intensity correlation $g^{(2)}$, exceeds a predetermined threshhold value. The devices shown in FIGS. 3, 7, 11 and 12 may be used for determining the degree of coherence.

In FIG. 14 there is shown the degree of dependence of the contrast $|\mu|$ from the angle $\Delta\theta$. It can be seen that the contrast $|\mu|$ reaches at $\Delta\theta = 2\theta_s$ a definite maximum. Based on this maximum it can therefore be shown by measuring the degree of coherence with great confidence that a macroscopic optical element 43' is present in the security blank 41. The authenticating features of the structure 43 remain hidden from the human eye, in view of the scattering element 43" scattering incident light thereon diffusely.

The pattern of the light scattered from the structure 43 is as a rule a speckled pattern, which renders mrasurement of the degree of coherence more difficult, if the speckled pattern is static. This difficulty can, however, become circumvented by moving the document or security blank 41 during measurement of the degree of coherence, for example, continuously, and thus forming an average value of the resulting light pattern. The document 41 is advantageously moved in a direction parallel to the longitudinal axis of the optical element 43'.

Ray dividers such as biprisms, partially light transmitting mirrors, reflecting elements having surfaces inclined to one another, and the like, may serve as the macroscopic optical element 43', which are then embedded in a material scattering the light diffusely, or have a surface which scatters the light diffusely. This will be explained in more detail by means of FIGS. 15 through 19.

In FIG. 15 there is shown a document 50, in whose carrier 42 there is embedded a strip 51. Each upper and lower surface of the strip 51 is formed with surfaces 52 and 53 inclined with respect to one another, in the example shown in FIG. 15, at an obtuse angle. The typical width of the strip 51 is of the order of 1 mm, while the length of the strip 51 may correspond to the length or width of the document 50. The strip 51 advantageously is made of metal, or a material covered with a metal layer, or of a transparent material. The carrier 42, may, for example, consist of a diffusely scattering paper, or of thermoplastic material having a diffusely scattering surface.

In FIG. 16 there is shown a document 54, including a carrier 42, in which there is embedded a strip 55 having a reflective surface. The strip 55 which in its unbent state has a rectangular cross section, but is here shown slightly bent about a center axis, so that two surfaces 52 and 53 are formed which are inclined at an obtuse angle to one another.

The carrier of the document 56 according to FIG. 17 consists of two layers 57 and 58 of transparent synthetic plastic connected to one another. The outer surfaces of the layers 57 and 58 are smooth. The common separation surface 59 of the layers 57 and 58 is formed, however, so as to scatter light diffusely. It therefore forms, on one hand, a ray divider, or ray splitter, which splits a ray 60 incident at an angle to the document 56 into a ray 61 reflected from the common separating surface 59, and into a ray 62 transmitted through the document 56. On the other hand, the course separating surface 59 forms a scattering element, which scatters the light ray 60 diffusely. When examining the document for genuiness, a narrow light bundle is sorted out from light scattered from the document 6 as shown by the rays 61, and another narrow light bundle in the form of a bundle of rays 62 is transmitted through the document 56, so as to measure the degree of coherence.

In FIG. 18 there is shown a document 63, having a carrier 42, in which there is embedded a transparent strip 64 having a rectangular cross section, and whose surface is coated with a thin and partially light-transmitting reflective layer 65. This reflective layer 65 acts as a ray divider, and forms a macroscopic optical element. The material for the surface structure of the carrier 42 may again serve as the diffuse scattering element. The examination for genuiness of the document is performed in a manner identical to that of the document 56.

Finally there is shown in FIG. 19 a document 66, having an element 67 embedded in a carrier 42, which element 67 has an irregular cross-section bounded by a plurality of surfaces 68, which are inclined to one another. These surfaces 68 split any light incident thereon by reflection or refraction into a plurality of light rays, or light bundles, while the carrier 42 scatters light incident thereon diffusely. The scattered light is therefore mutually coherent in several predetermined directions. These predetermined directions are preferably arranged in a code pattern. When examining the document for genuiness, a plurality of narrow light bundles are sorted out or extracted, and the code is read out by measuring the degree of coherence.

In the spatial structure 72 of the type described in FIGS. 1, 2, and 15 through 19, a light source 73 serves to illuminate the structure 72, which is at least quasi-monochromatic, and has a certain spatial coherence. Two narrow bundles of light rays formed from light scattered from the structure 72 are made to impinge on light-sorting members 74 and 75, or 74' and 75', respectively, which are formed to receive light only along respective predetermined directions, and which may contain one or more light deflecting elements, and means for generating a variable optical path difference between the bundle of light rays incident on element 74 and 75, or 74' and 75'. The average scattering angle of the two sorted out bundles of light rays is denoted as $\theta_1$ or $\theta_2$. The two bundles of light rays sorted out from the light scattered from the document 72 are reunited in a superposition member 76. Detector means 77 including, for example, a photoelectric detector, receive the reunited bundle of light rays, and convert them into electrical signals; the detector means 77 include signal processing means and decision means which form a "yes" or "no" output. The various elements 73 through 77 may be mounted securely or movably on a (non-illustrated) base plate.

The devices of FIGS. 20 and 21 differ from one another by the number of image reversals (for example mirror reversals) to which the bundle of light rays are subjected in the light sorting members 74 and 75, or 74' and 75', as well as in the superposition member 76, as they pass from the structure 72 up to the point when they are reunited. In the device of FIG. 20 the number of image reversals is odd, and in the device according to FIG. 21 the number of image reversals is even.

The type of superposition of the light rays obtained from the scattered light of the structure 72 is determined by the number of image reversals. If this number is odd, then the superposition results in an inverse image. If the number is even, then the superposition is normal. The inverse superposition corresponds to symmetrical scanning to test for coherence, and the normal superposition corresponds to asymmetrical scanning.

The geometrical properties of the devices described require that a small deviation of the light beam from the average direction of scattering results in a corresponding deviation of the received light beam. In a corresponding manner an angular deviation $\Delta\theta$ at the detector system 77 corresponds to an angular deviation $\Delta\theta_1$ or $\Delta\theta_2$ of the sorted-out bundle of rays. The inverse superposition is characterized by the fact that the angular deviations $\Delta\theta_1$ and $\Delta\theta_2$ each have a different sense, namely + or − (FIG. 20). During normal superposition the sense of the angular deviations $\Delta\theta_1$ and $\Delta\theta_2$ remain equal (FIG. 21). This state of affairs is clarified as follows:

Inverse Superposition (FIG. 20)

The number of image reversals is odd, and corresponds to symmetrical scanning; the sense of $\Delta\theta_1$ and $\Delta\theta_2$ differs.

Normal Superposition (FIG. 21)

The number of image reversals is even; this corresponds to assymetrical scanning; $\Delta\theta_1$ and $\Delta\theta_2$ have the same sense.

The contrast $|\mu|$ of the interference fringes appearing on the detector plane of the detector system 77 depends from the average scattering angles $\theta_1$ and $\theta_2$, as well as from the angular deviation $\Delta\theta$. FIGS. 22 and 23 show the computer-determined function $|\mu| = f(\theta_1, \theta_2)$. in perspective for the case where the spatial structure 72 is a macroscopic ray divider, or ray splitter following the law of geometrical optics. FIGS. 24 and 25 show the dependence of the contrast $|\mu|$ from the angular deviation $\Delta\theta$ at fixedly adjusted average scattering angles $\theta_1$ and $\theta_2$.

The curve 78 shown in FIGS. 22 and 24 corresponds to symmetrical scanning, and has a series of isolated maxima.

During asymmetrical scanning the curves 79 and 80 result, as can be seen from FIGS. 23 and 25, which are relatively constant over a wide angular range. The maximal height of the curves 79 and 80 is, however, critically dependent from the selected principal directions, namely dependent from the scattering angles $\theta_1$ and $\theta_2$. If $\sin\theta_1 - \sin\theta_2$ assumes a "suitable" value, then according to the curve 79 a considerable contrast $|\mu|$ results over a wide range of the angular deviations $\Delta\theta$. If $\sin\theta_1 - \sin\theta_2$ deviates only slightly from this value, then according to the curve 80 practically no contrast exists.

"Suitable" values of $\sin\theta_1 - \sin\theta_2$ are determined by the diffraction or scattering properties of the structure 72 of the authenticating feature without being corrupted by any noise. Each pair of scattering directions, in which the structure 72 determines an intensity concentration of the scattered light, determines such a value.

In a periodic refraction grating, for example, such suitable values are integral multiples of $\lambda/b$, where $\lambda$ is a wavelength of the light source 73, and b the period of the diffraction. Based on the aforementioned description during normal superposition, the following measurement method is preferred. First the principal directions are set for suitable values of $\theta_1$ and $\theta_2$. In general these directions are not limited to a certain plane, but for simplicity's sake they are described by the angles $\theta_1$ and $\theta_2$. If the principal directions are so chosen that the difference $\sin\theta_1 - \sin\theta_2$ is matched to the properties of the authenticating feature, then there is shown in the detector plane a long series of distinct interference fringes, the intensities of which are shown in FIG. 27 by a curve 81 and which may be easily detected. If the difference $\sin\theta_1 - \sin\theta_2$ is, however, erroneously selected, or if the document 71 lacks any authenticating feature, then there results in the detector plane along the curve 82 of the FIG. 27 only a diffuse intensity distribution.

During inverse superposition, there appear on the detector plane, as can be seen from FIG. 26, only relatively narrow, or sometimes very narrow series of interference fringes, in comparison to the large number of interference fringes arising during normal superposition.

The aforedescribed apparatus is particularly suitable for measurements of intensity during normal superposition, that is during the presence of interfering fringes on the detector plane the intensity variation is advantageously used to obtain a measurement value to form the "yes" and "no" signals. This change of intensity is also a measure for the degree of coherence of the bundles of light rays, but can be measured more simply than the actual degree of coherence. According to FIG. 28, in which the same reference numeral have been used as those in FIG. 21, the change of intensity of the interference fringes in the detector plane can be obtained with the aid of a single photodetector 83, the position of which can be varied, corresponding to the angular deviation $\Delta\theta$ (FIG. 21), by an angle $\pm x$ by means of a signal processing circuit not illustrated in FIG. 28. Any change in intensity of the interference fringes can be used in conjunction with stored threshhold values or threshhold functions to form a "yes" or "no" decision pertaining to the genuineness of the document examined. A group of stationary photoelectric diodes can be used in lieu of a movable photoelectric diode.

A particularly simple apparatus for symmetrical scanning is shown in FIG. 29. The document 71 to be examined is disposed on a first leg of a V-shaped holder 84, the second leg of which has mounted a mirror 85 thereon. The light source 73 and the holder 84 with the document 71 and the mirror 85 are mounted on a (non-illustrated) frame, which is pivotable about an axis 86. A second group of elements which are stationary includes two light-sorting members 87 and 88 extracting light scattered from the document 71 only within a narrow angular range, and a detecting system 89. The detecting system 89 may contain a correlation measurement device, for example according to FIG. 11, or an interferometric device, for example, according to FIG. 3.

The pivoting angle of the frame is denoted in FIG. 29 as $\phi_1$, the external angle between the plane of the document 71 and the plane of the mirror 85 is denoted as $\alpha$, and the angle between the plane of the document 71 and the direction of incidence of the light is denoted as $\beta$.

$\gamma$ denotes the angle between the first bundle of light rays incident on the light-sorting member 87, and the second bundle of rays scattered from the document 71, reflected from the mirror 85, and impinging on the light-sorting member 88, The average scattering angles of the two light bundles formed from the light scattered from the document 71 are again denoted as $\theta_1$ and $\theta_2$, respectively.

The aforedescribed apparatus is constructed so that the selected scattering angles $\theta_1$ and $\theta_2$ are defined by $\theta_1 = c + \phi$ and $\theta_2 = c' - \phi$, where c and c' are constants. By pivoting the frame by an angle $\phi$, the angles $\theta_1$ and $\theta_2$ may be varied in opposite respective directions. The sum of the angles $\theta_1$ and $\theta_2$ is defined by the equation $$\theta_1 + \theta_2 = \gamma + 2(\alpha + \beta - \pi)$$

If the angles $\alpha$, $\beta$ and $\gamma$ are so chosen, that the right hand side of the equation is zero, then $\theta_1 = -\theta_2$, in other words this constitutes a symmetrical scanning in a narrow sense, which requires only a single mechanical movement.

If the apparatus according to FIG. 20 is chosen so that $\theta_2 = \theta_1$, then a symmetrical scanning can also be achieved by varying the wavelength or frequency of the light source 73.

In FIG. 30 there is shown a document 90, in which a spatial structure 91 is disposed at an angle to the substantially parallel surfaces of the carrier 92. By this means the effective plane of the preferably macroscopic structure 91 can be hidden, and the probability of successful forgery further decreased. The structure 91 can be still better hidden, if the document 90 consists of a diffusely scattering material, thus forming a stochastic scattering component. The structure 91 is preferably disposed on the carrier 92 at an angle as shown in FIG. 31. If a plurality of such carriers 92 with different respective orientations are embedded in the document 90, a structure is obtained having characteristic directions of diffraction or deflection, which are not all disposed in one plane. The document 93 shown in FIG. 32 contains an embedded carrier 94 having a macroscopic sawtooth structure 95, and a microscopic structure 96 superimposed thereto. The macroscopic structure 95 causes a refraction or reflection, according to the laws of geometrical optics, and the microscopic structure 96 causes a characteristic deflection, again resulting in the fact that the characteristic directions of refraction or deflection are not all disposed in the same plane.

In FIG. 33 there is shown a document 97 with a carrier 98 embedded therein, which has a macroscopic diffraction structure 99 and a reflective layer 100 coated thereon, which is partially transparent to light. The reflective layer 100 forms a ray divider or a ray splitter, which splits a ray incident at an angle to the document 97 into two separate rays along a direction of reflection, and along a direction of transmission, respectively. The deflection structure 99 causes the rays to be divided or split even further in another plane. If a stochastic scattering component is to be superimposed on the deterministic scattering component formed by the diffraction structure 99, and the reflective layer 100, then this can be accomplished in a simple manner by a purposely caused geometric roughness of the diffraction structure 99.

In FIG. 34 there is illustrated a security thread 101, which is embedded as an authenticating feature into the document. The macroscopic cross-section of the security thread 101 has a constant cross-section over a portion of its length differing from a rectangular cross section, or from a circular cross section, while its surface is formed as a microscopically embossed structure 102. The combination of the macroscopic cross-section with a microscopic embossed structure 102, results in an authenticating feature which is particularly difficult to forge, and which is distinguished by a plurality of characteristic directions of diffraction.

We wish it to be understood that we do not desire to be limited to the exact details of construction shown and described, for obvious modifications will occur to a person skilled in the art.

Having thus described the invention, what we claim as new and desire to be secured by Letters Patent is as follows:

1. In a method of determining the genuineness of a security blank having a light redirecting spatial structure establishing at least one authenticating feature, said method including illuminating said spatial structure, forming from light scattered from said spatial structure two narrow bundles of light rays, and converting said two bundles of light rays into electrical signals, said spatial structure having characteristics enabling a predetermined amount of coherence to be established between said two bundles of light rays, the improvement comprising the steps of worsening said characteristics by a prearranged measure so as to largely frustrate recognition of the function of said one authenticating feature by intensity measurements of the scattered light, while still allowing recognition thereof by determining a sufficient degree of coherence between said two bundles of light rays, determining the degree of coherence between said two bundles of light rays, forming "yes" or "no" outputs in dependence of the degree of coherence determined, and ascertaining from said outputs information pertaining to the genuineness of said security blank.

2. In a method as claimed in claim 1, wherein said spatial structure is illuminated substantially at a selected wave length of light, and wherein determining the degree of coherence between said two bundles of light rays includes the steps of superimposing said bundles of light rays, forming high and low intensity interference fringes in a plane from said superimposed bundles of light rays, setting the phase between said bundles of light rays so as to obtain interference fringes of varying intensity, and forming a contrast from said values, whereby said "yes" and "no" outputs are formed in dependence of said contrast.

3. In a method as claimed in claim 2, wherein the phase between said bundles of light rays is varied continuously.

4. In a method as claimed in claim 2, further comprising the step of varying the phase between said bundles of light rays so as to obtain interference fringes of maximum and minimum intensity values.

5. In a method as claimed in claim 2, further comprising the step of detecting the presence of said interference fringes photoelectrically.

6. In a method as claimed in claim 2, wherein said contrast is formed by dividing the difference between said maximum and minimum intensity values by the sum of said maximum and minimum intensity values.

7. In a method as claimed in claim 2, wherein said bundles of light rays are formed so as to diverge from one another at an angle, and the phase between said bundles of light is varied by pivoting said spatial structure.

8. In a method as claimed in claim 2, further comprising the step of storing a predetermined threshhold value, comparing said contrast with said predetermined threshold value, and forming said "yes" output only upon said contrast exceeding said predetermined threshold value.

9. In a method as claimed in claim 2, wherein the phase between said bundles of light rays is varied by varying the path length therebetween.

10. In a method as claimed in claim 2, wherein the phase between said bundles of light rays is varied by varying the light wavelength of the light illuminating said structure.

11. In a method as claimed in claim 1, wherein said degree of coherence between said two bundles of light rays is determined electronically.

12. In a method as claimed in claim 2, wherein said bundles of light rays are formed so as to diverge at an angle from one another, and are mutually coherent with one another, and further comprising the step of arranging the mutually coherent light rays in several code patterns.

13. A security blank including a light-redirecting, multi-component, spatial structure
comprising in combination,
a deterministic component establishing at least one authenticating feature, and
a stochastic component superimposed on said deterministic component, and sufficiently obscuring said deterministic component so as largely to frustrate recognition of the function of said authenticating feature by intensity measurements of light deflected therefrom, but permitting recognition of the function of said authenticating feature by measuring the degree of coherence of two narrow bundles of light rays obtained from light reflected from said spatial structure upon illumination thereof by light of a selected wavelength.

14. The security blank as claimed in claim 13, wherein said components are elongated, and said deterministic component has a plurality of certain measurement distances, and said stochastic component has a correlation length not exceeding a predetermined fraction of one of said measurement distances.

15. The security blank as claimed in claim 14, wherein said predetermined fraction is at most about one-fifth.

16. The security blank as claimed in claim 13, wherein said deterministic component includes a macroscopic element redirecting any light ray incident thereon by refraction or reflection along two predetermined directions, and said stochastic component includes a light scattering element diffusely scattering light incident thereon.

17. The security blank as claimed in claim 16, further including a carrier at least partially transparent to light, and wherein said macroscopic element is embedded in said carrier and has at least one surface including two surface portions inclined at a predetermined angle to one another.

18. The security blank as claimed in claim 17, wherein said macroscopic element has a substantially rectangular cross-section.

19. The security blank as claimed in claim 16, further including a carrier at least partially transparent to light, and wherein said macroscopic element is embedded in said carrier and includes ray dividing means dividing a ray incident thereon into two separate rays of light forming a predetermined angle with one another.

20. The security blank as claimed in claim 19, wherein said carrier includes two layers having rough surfaces juxtaposed with one another constituting said ray dividing means.

21. The security blank as claimed in claim 19, wherein said ray dividing means includes a transparent band, and a partially light transmitting reflective layer mounted on one side of said band.

22. The security blank as claimed in claim 13, further including a carrier, and wherein said deterministic component includes a macroscopic element embedded in said carrier and having a plurality of surfaces inclined a respective predetermined angle to one another.

23. The security blank as claimed in claim 13, further including a carrier at least partially transparent to light, and wherein said stochastic component includes a light scattering element, and said deterministic component includes a macroscopic element having a surface diffusely scattering light incident thereon, said surface forming said light scattering element.

24. The security blank as claimed in claim 13, further including a carrier at least partially transparent to light and composed of a certain material, and wherein said stochastic component includes a light scattering element diffusely scattering light incident thereon, said certain material forming said light scattering element.

25. The security blank as claimed in claim 16, wherein said macroscopic element is formed from a transparent material.

26. The security blank as claimed in claim 16, wherein at least the surface portions of said macroscopic element are formed of metal.

27. The security blank as claimed in claim 13, further including a carrier at least partially transparent to light, and having two major surfaces substantially parallel to one another, and wherein said spatial structure is substantially disposed in a plane forming a predetermined angle with at least one of said surfaces.

28. The security blank as claimed in claim 27, wherein said predetermined angle is an acute angle.

29. The security blank as claimed in claim 13, wherein said deterministic component includes a macroscopic element, and said stochastic component includes a light scattering element superimposed on said macroscopic element.

30. The security blank as claimed in claim 13, further comprising a partially light-transmitting reflective layer superimposed on said spatial structure.

31. The security blank as claimed in claim 13, further including a carrier at least partially transparent to light, and wherein said authenticating feature includes an elongated security thread embedded in said carrier having a macroscopic cross-section other than circular or rectangular, being substantially constant over a prearranged portion of the length, and having an embossed microscopic surface structure.

32. In an apparatus for determining the genuineness of a security blank, said security blank including at least one authenticating feature in the form of a spatial structure, said apparatus being adapted to be used with a light source illuminating said spatial structure at a selected wavelength of light, and including at least two light-sorting members forming an angle between each other, each selecting a narrow bundle of light rays from light scattered from said spatial structure, and redirecting said bundle of light rays, photoelectric means receiving the redirected bundle of light rays and generating an electrical signal therefrom, signal processing means connected to said photoelectric means receiving said electrical signal and determining therefrom a characteristic measurement value for said spatial structure, and decision means forming "yes" or "no" outputs in dependence of said characteristic measurement value, the improvement comprising an elongated deterministic component having a plurality of measurement distances, and an elongated stochastic component, said components being included in said spatial structure, said stochastic component scattering light impinging thereon in a diffuse manner, and having a correlation length not exceeding a predetermined fraction of one of said measurement distances, said signal processing means determining said characteristic measurement value by determining the degree of coherence of said narrow bundles of light rays.

33. The apparatus as claimed in claim 32, wherein said predetermined fraction is at most one fifth of one of said measurement distances.

34. An apparatus as claimed in claim 32, further comprising superimposing means superimposing said narrow bundles of light rays.

35. An apparatus as claimed in claim 34, further comprising a light path-difference forming member arranged ahead of said superimposing means, so as to form a variably adjustable optical difference path between said light bundles.

36. An apparatus as claimed in claim 34, further comprising pivotable means holding said security blank, and wherein said photoelectric means are disposed in a plane, and wherein interference fringes of varying intensity obtained from light rays passing through said superimposing means appear on said plane, a contrast being defined between the light and the dark of said interference fringes, said decision means forming a "yes" output only upon said contrast exceeding a predetermined value when pivoting said pivotable means.

37. An apparatus as claimed in claim 36, wherein said contrast is defined between the lightest and darkest of said interference fringes upon adjusting said pivotable means for said light and dark interference fringes to attain maximum light and dark values, respectively.

38. An apparatus as claimed in claim 32, wherein said signal processing means includes electronic correlator means.

39. An apparatus as claimed in claim 32, further including means for operatively varying said angle, said decision means including storage means storing a threshhold value comparing said measurement value therewith, and forming a "yes" output only upon said measurement value exceeding said threshhold value.

40. An apparatus as claimed in claim 34, wherein said superimposing means form high and low intensity interference fringes in a predetermined plane, and further including means of setting the path difference of said angle between said bundle of light rays so as to obtain interference fringes of light and dark intensity values, said signal processing means determining from said light and dark intensity values said degree of coherence of said narrow bundles of light rays.

41. An apparatus as claimed in claim 40, further comprising means for varying the path difference or said angle between said bundle of light rays so as to obtain interference fringes of maximum light and dark values, respectively, said signal processing means determining from said of maximum values said degree of coherence of said narrow bundles of light rays.

42. An apparatus as claimed in claim 36, wherein said light-sorting members and said superimposing means form at least a partial image of said spatial structure in said plane so as to undergo a predetermined number of reversals.

43. An apparatus as claimed in claim 42, wherein said number of reversals is even.

44. An apparatus as claimed in claim 42, wherein said number of reversals is odd.

45. An apparatus as claimed in claim 32, further comprising pivoting means adapted to have the light source installed thereon, and wherein one of said light-sorting members is mounted on said pivoting means.

46. An apparatus as claimed in claim 32, wherein the wavelength of the light is selectable within predetermined limits.

47. An apparatus as claimed in claim 32, which is automatically operable.

* * * * *